(12) United States Patent
Suh et al.

(10) Patent No.: US 12,542,271 B2
(45) Date of Patent: Feb. 3, 2026

(54) LITHIUM SECONDARY BATTERY

(71) Applicant: LG Chem, Ltd., Seoul (KR)

(72) Inventors: Min Won Suh, Daejeon (KR); So Yeon Kim, Daejeon (KR); Nan Ji Yun, Daejeon (KR); Yo Jin Kim, Daejeon (KR); Sae Young Oh, Daejeon (KR); Hui Kyoung Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 830 days.

(21) Appl. No.: 16/757,893

(22) PCT Filed: Nov. 6, 2018

(86) PCT No.: PCT/KR2018/013411
§ 371 (c)(1),
(2) Date: Apr. 21, 2020

(87) PCT Pub. No.: WO2019/088807
PCT Pub. Date: May 9, 2019

(65) Prior Publication Data
US 2020/0343536 A1   Oct. 29, 2020

(30) Foreign Application Priority Data

Nov. 6, 2017   (KR) .................... 10-2017-0146924
Nov. 6, 2018   (KR) .................... 10-2018-0135104

(51) Int. Cl.
*H01M 4/1315* (2010.01)
*C01G 51/42* (2025.01)
(Continued)

(52) U.S. Cl.
CPC .......... *H01M 4/1315* (2013.01); *C01G 51/42* (2013.01); *C01G 53/50* (2013.01); *C01G 53/504* (2025.01);
(Continued)

(58) Field of Classification Search
CPC ...... H01M 4/362; H01M 4/364; H01M 4/366; H01M 4/131; H01M 4/1393; H01M 4/133;
(Continued)

(56) References Cited

U.S. PATENT DOCUMENTS 5,928,622 A   7/1999 Hwang et al.
6,746,800 B1   6/2004 Sunagawa et al.
(Continued)

FOREIGN PATENT DOCUMENTS

CN   1595687 A   3/2005
CN   101047235 A   10/2007
(Continued)

OTHER PUBLICATIONS

Mitani JP2009064574 Machine Translation (Year: 2009).*
(Continued)

*Primary Examiner* — Ula C Ruddock
*Assistant Examiner* — Anna Korovina
(74) *Attorney, Agent, or Firm* — Lerner David LLP (57) ABSTRACT

A lithium secondary battery includes a positive electrode including a lithium manganese-based first positive electrode active material having a spinel structure doped and coated and a lithium nickel-manganese-cobalt-based second positive active material, a negative electrode including artificial graphite having a specific surface area (BET) of 0.1-1.2 m²/g and at least one selected from the group consisting of soft carbon and natural graphite which have a greater specific surface area than the artificial graphite, a separator interposed between the positive electrode and the negative electrode, and an electrolyte.

13 Claims, 2 Drawing Sheets

(51) Int. Cl.

| | |
|---|---|
| *C01G 53/50* | (2025.01) |
| *C01G 53/504* | (2025.01) |
| *H01M 4/02* | (2006.01) |
| *H01M 4/131* | (2010.01) |
| *H01M 4/36* | (2006.01) |
| *H01M 4/505* | (2010.01) |
| *H01M 4/525* | (2010.01) |
| *H01M 4/587* | (2010.01) |
| *H01M 4/62* | (2006.01) |
| *H01M 10/0525* | (2010.01) |

(52) U.S. Cl.
CPC ........... *H01M 4/131* (2013.01); *H01M 4/366* (2013.01); *H01M 4/505* (2013.01); *H01M 4/525* (2013.01); *H01M 4/587* (2013.01); *H01M 4/62* (2013.01); *H01M 10/0525* (2013.01); *C01P 2002/32* (2013.01); *C01P 2004/53* (2013.01); *C01P 2006/40* (2013.01); *H01M 2004/021* (2013.01); *H01M 2004/028* (2013.01)

(58) Field of Classification Search
CPC ...... H01M 4/583; H01M 4/505; H01M 4/625; Y02E 60/10
See application file for complete search history.

(56) References Cited

U.S. PATENT DOCUMENTS

| | | | | |
|---|---|---|---|---|
| 6,803,150 | B1* | 10/2004 | Iriyama | H01M 4/1393 252/502 |
| 6,902,845 | B2 | 6/2005 | Tani et al. | |
| 2001/0046628 | A1* | 11/2001 | Oesten | H01M 4/366 423/594.15 |
| 2003/0157407 | A1 | 8/2003 | Kosuzu et al. | |
| 2006/0035151 | A1 | 2/2006 | Kumeuchi et al. | |
| 2006/0263690 | A1 | 11/2006 | Suhara et al. | |
| 2007/0190420 | A1 | 8/2007 | Ryu et al. | |
| 2007/0248884 | A1 | 10/2007 | Tsuchiya | |
| 2008/0070119 | A1 | 3/2008 | Miura et al. | |
| 2008/0131778 | A1 | 6/2008 | Watanabe et al. | |
| 2009/0017383 | A1 | 1/2009 | Suhara et al. | |
| 2010/0012886 | A1 | 1/2010 | Ryu et al. | |
| 2010/0294985 | A1 | 11/2010 | Suhara et al. | |
| 2011/0217574 | A1 | 9/2011 | Toyama et al. | |
| 2012/0009475 | A1* | 1/2012 | Nakura | H01M 4/5825 429/218.1 |
| 2012/0177986 | A1* | 7/2012 | Aida | H01M 50/529 429/188 |
| 2012/0177994 | A1 | 7/2012 | Kim et al. | |
| 2013/0022872 | A1 | 1/2013 | Noh et al. | |
| 2013/0302685 | A1 | 11/2013 | Kim et al. | |
| 2014/0038052 | A1 | 2/2014 | Song et al. | |
| 2014/0342230 | A1 | 11/2014 | Watanabe et al. | |
| 2014/0363736 | A1 | 12/2014 | Kim et al. | |
| 2015/0030928 | A1 | 1/2015 | Kwak et al. | |
| 2015/0037678 | A1 | 2/2015 | Kwak et al. | |
| 2015/0357627 | A1 | 12/2015 | Kwak et al. | |
| 2016/0006031 | A1* | 1/2016 | Kaseda | H01M 4/505 429/223 |
| 2016/0013480 | A1* | 1/2016 | Sikha | H01M 4/043 427/126.6 |
| 2016/0043395 | A1 | 2/2016 | Kawakami et al. | |
| 2016/0079589 | A1 | 3/2016 | Ohara et al. | |
| 2016/0329563 | A1 | 11/2016 | Oh et al. | |
| 2017/0187041 | A1* | 6/2017 | Yamada | H01M 4/625 |
| 2018/0261842 | A1 | 9/2018 | Park et al. | |
| 2018/0294477 | A1 | 10/2018 | Shin et al. | |
| 2019/0140277 | A1 | 5/2019 | Dong et al. | |
| 2019/0252675 | A1 | 8/2019 | Ohara et al. | |

FOREIGN PATENT DOCUMENTS

| | | |
|---|---|---|
| CN | 102044671 A | 5/2011 |
| CN | 102054985 A | 5/2011 |
| CN | 102683669 A | 9/2012 |
| CN | 103633314 A | 3/2014 |
| CN | 103730654 A | 4/2014 |
| CN | 103794751 A | 5/2014 |
| CN | 104321912 A | 1/2015 |
| CN | 105870441 A | 8/2016 |
| CN | 105914361 A | 8/2016 |
| CN | 106953070 A | 7/2017 |
| EP | 3163656 A1 | 5/2017 |
| JP | 2000306577 A | 11/2000 |
| JP | 2000315503 A | 11/2000 |
| JP | 2003197192 A | 7/2003 |
| JP | 2006278322 A | 10/2006 |
| JP | 2008098142 A | 4/2008 |
| JP | 2009064574 A | 3/2009 |
| JP | 2010137996 A | 6/2010 |
| JP | 2011187193 A | 9/2011 |
| JP | 2011216214 A | 10/2011 |
| JP | 5213015 B2 | 6/2013 |
| JP | 2015527719 A | 9/2015 |
| KR | 20050030899 A | 3/2005 |
| KR | 20070021040 A | 2/2007 |
| KR | 20070114411 A | 12/2007 |
| KR | 20110081107 A | 7/2011 |
| KR | 20120081808 A | 7/2012 |
| KR | 20130002750 A | 1/2013 |
| KR | 20130117016 A | 10/2013 |
| KR | 20130125236 A | 11/2013 |
| KR | 20140013391 A | 2/2014 |
| KR | 20140018628 A | 2/2014 |
| KR | 20140095999 A | 8/2014 |
| KR | 20150013077 A | 2/2015 |
| KR | 20150028663 A | 3/2015 |
| KR | 20150040239 A | 4/2015 |
| KR | 20150043769 A | 4/2015 |
| KR | 20150135450 A | 12/2015 |
| KR | 20160026402 A | 3/2016 |
| KR | 20160084600 A | 7/2016 |
| KR | 20160094064 A | 8/2016 |
| KR | 101670664 B1 | 10/2016 |
| KR | 20170063396 A | 6/2017 |
| KR | 20170103184 A | 9/2017 |
| WO | 2004105162 A1 | 12/2004 |
| WO | 2013046711 A1 | 4/2013 |

OTHER PUBLICATIONS

International Search Report from Application No. PCT/KR2018/013403 mailed Apr. 12, 2019, 3 pages.
Li et al., "Enhanced Elevated-Temperature Performance of Al-Doped LiMn2O4 as Cathodes for Lithium Ion Batteries", American Institute of Physics, AIP Conference Proceedings 1890, 040098, Oct. 2017, pp. 1-6.
International Search Report for Application No. PCT/KR2018/013405, mailed Mar. 25, 2019, pp. 1-2.
International Search report from Application No. PCT/KR2018/013411, mailed Apr. 11, 2019, pp. 1-3.
Extended European Search Report with Written Opinion for Application No. 18872343.1 dated Jul. 7, 2020, 7 pages.
Extended European Search Report including the Written Opinion for Application No. EP 18874163.1 dated Mar. 20, 2020, 8 pages.
Xiao et al., "Atomic layer coating to mitigate capacity fading associated with manganese dissolution in lithium ion batteries", Electrochemistry Communications, Elsevier, Amsterdam, NL, vol. 32, Mar. 28, 2013, pp. 31-34, XP028531633.
Chinese Search Report for Application No. 201880027917.7 dated Dec. 2, 2021, 3 pages.
Chinese Search Report for Application No. 201880027952.9 dated Nov. 18, 2021, 2 pages.

(56) References Cited

OTHER PUBLICATIONS

Chinese Search Report for Application No. 201880066173.X dated Dec. 2, 2021, 2 pages.

* cited by examiner

LITHIUM SECONDARY BATTERY

TECHNICAL FIELD

Cross-Reference to Related Applications

The present application is a national phase entry under 35 U.S.C. § 371 of International Application No. PCT/KR2018/013411, filed on Nov. 6, 2018, which claims priority from Korean Patent Application Nos. 10-2017-0146924, filed on Nov. 6, 2017, and 10-2018-0135104, filed on Nov. 6, 2018, the disclosures of which are incorporated herein in its entirety by reference.

Technical Field

The present invention relates to a lithium secondary battery including a positive electrode active material having a spinel structure and having excellent high-temperature life properties and excellent electrochemical properties after high-temperature storage.

BACKGROUND ART

As technology development and demand for mobile devices have increased, the demand for secondary batteries as an energy source has been rapidly increased. Among such secondary batteries, lithium secondary batteries having high energy density and voltage, long cycle life, and low self-discharging rate have been commercialized and widely used.

As a positive electrode active material of a lithium secondary battery, various lithium transition metal oxides such as $LiCoO_2$, $LiNiO_2$, $LiMnO_2$, $LiMn_2O_4$ or $LiFePO_4$ are being developed. Among these, lithium manganese-based oxides having a spinel structure, such as $LiMn_2O_4$ have advantages in that the thermal stability, output properties and lifespan properties thereof are excellent and the price thereof is low, but have disadvantages in that structural deformation (Jahn-Teller distortion) occurs due to $Mn^{3+}$ during charging/discharging and Mn elution occurs due to HF formed by a reaction with an electrolyte at a high temperature so that performance is rapidly deteriorated.

Also, as for $LiMn_2O_4$, the material itself has a high working voltage, but has a low capacity per unit mass which is about 110 mAh/g or less, as well as a low density, thereby having a reduced energy density, so that it is difficult to apply $LiMn_2O_4$ to a battery requiring high capacity.

DISCLOSURE OF THE INVENTION

Technical Problem

An aspect of the present invention provides a lithium secondary battery having excellent electrochemical properties after high-temperature storage and excellent high-temperature life properties while including a positive electrode active material having a spinel structure.

Technical Solution

According to an aspect of the present invention, there is provided a lithium secondary battery including a positive electrode including a lithium manganese-based first positive electrode active material having a spinel structure and a lithium nickel-manganese-cobalt-based second positive active material, a negative electrode including artificial graphite having a specific surface area (BET) of 0.1-1.2 $m^2/g$ and at least one selected from the group consisting of soft carbon and natural graphite which have a greater specific surface area than the artificial graphite, a separator interposed between the positive electrode and the negative electrode, and an electrolyte.

At this time, the first positive electrode active material includes a lithium manganese oxide represented by Formula 1 below, and a coating layer positioned on the surface of the lithium manganese oxide and including one or more elements selected from the group consisting of Al, Ti, W, B, F, P, Mg, Ni, Co, Fe, Cr, V, Cu, Ca, Zn, Zr, Nb. Mo, Sr, Sb, Bi, Si, and S.

[Formula 1]

(In Formula 1, $M^1$ is one or more doping elements selected from the group consisting of Al, Li, Mg, Zn, B, W, Ni, Co, Fe, Cr, V, Ru, Cu, Cd, Ag, Y, Sc, Ga, In, As, Sb, Pt, Au, and Si and A is one or more elements selected from the group consisting of F, Cl, Br, I, At, and S, and $0 \leq a \leq 0.2$, $0 < b \leq 0.5$, and $0 \leq c \leq 0.1$)

Advantageous Effects

A first positive electrode active material to be applied to a lithium secondary battery according to the present invention includes a doping element, thereby having excellent structural stability, and has a coating layer formed on the surface thereof, so that the contact with an electrolyte is minimized and manganese elution at a high temperature is suppressed. Thereby, the first positive electrode active material according to the present invention has excellent high-temperature properties compared to those of the prior art.

In addition, the lithium secondary battery according to the present invention uses the first positive electrode active material having a spinel structure having excellent high-temperature stability as described above together with a high-nickel lithium nickel-cobalt-manganese-based active material. Thereby, a high energy density may be implemented.

In addition, the lithium secondary battery according to the present invention uses, as a negative electrode active material, a mixture of artificial graphite having a certain specific surface area and natural graphite and/or soft carbon which have a greater specific surface area than the artificial graphite, so that resistance increase during high-temperature long-term storage is suppressed, and the deterioration of an electrode due to the de-intercalation of an active material may be prevented. Thereby, excellent electrochemical properties may be implemented.

BEST MODE FOR CARRYING OUT THE INVENTION

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

In the present specification, an average particle diameter ($D_{50}$) may be defined as a particle diameter at 50% of a particle diameter distribution, and may be measured by using a laser diffraction method. Specifically, target particles are dispersed in a dispersion medium, and then introduced to a commercially available laser diffraction particle size measurement device (for example, Microtrac MT 3000) to be irradiated with ultrasonic waves of about 28 kHz to an output of 60 W. Thereafter, the average particle diameter ($D_{50}$) may be measured at 50% in cumulative particle volume distribution according to particle diameters in the measurement device.

In the present specification, ICP analysis is performed using an inductively coupled plasma atomic emission spectrometer (ICP-OES; Optima 7300DV, PerkinElmer Co.).

In the present specification, specific surface area is measured by a BET method, specifically, may be calculated from the adsorption amount of nitrogen gas under a liquid nitrogen temperature (77K) using Belsorp-mino II of BEL Japan Co.

Also, in the present specification, % means wt % unless otherwise noted.

The inventors of the present invention have found that the deterioration of electrochemical properties at a high temperature may be effectively prevented when a lithium secondary battery is manufactured by using, as a positive electrode active material, a mixture of a first positive electrode active material having a spinel structure doped and coated and a lithium nickel-cobalt-manganese-based oxide, and as a negative electrode active material, a mixture of artificial graphite having a certain specific surface area and one of natural graphite and soft carbon.

Specifically, a lithium secondary battery of the present invention includes a positive electrode including a lithium manganese-based first positive electrode active material having a spinel structure and a lithium nickel-manganese-cobalt-based second positive active material, a negative electrode including artificial graphite having a specific surface area (BET) of 0.1-1.2 $m^2$/g and one or more selected from the group consisting of soft carbon and natural graphite which have a greater specific surface area than the artificial graphite, a separator interposed between the positive electrode and the negative electrode, and an electrolyte, wherein the positive electrode active materials include a lithium manganese oxide represented by Formula 1 below, and a coating layer positioned on the surface of the lithium manganese oxide and containing one or more elements selected from the group consisting of Al, Ti, W, B, F, P, Mg, Ni, Co, Fe, Cr, V, Cu, Ca, Zn, Zr, Nb. Mo, Sr, Sb, Bi, Si, and S.

Hereinafter, each components of a lithium secondary battery of the present invention will be described in more detail.

Positive Electrode

A positive electrode according to the present invention includes a lithium manganese-based first positive electrode active material having a spinel structure and a lithium nickel-manganese-cobalt-based second positive active material.

(1) First Positive Electrode Active Material

The first positive electrode active material is a positive electrode active material having a spinel structure including a lithium manganese oxide represented by Formula 1 below, and a coating layer positioned on the surface of the lithium manganese oxide.

[Formula 1]

In Formula 1, the $M^1$ is a doping element substituted for a manganese site in the lithium manganese oxide, and may be one or more elements selected from the group consisting of Al, Li, Mg, Zn, B, W, Ni, Co, Fe, Cr, V, Ru, Cu, Cd, Ag, Y, Sc, Ga, In, As, Sb, Pt, Au, and Si. Preferably, the $M^1$ may be one or more elements selected from the group consisting of Al, Li, Mg, and Zn.

The A is an element substituted for an oxygen site in the lithium manganese oxide, and may be one or more elements selected from the group consisting of F, Cl, Br, I, At, and S.

Meanwhile, the 1+a represents a molar ratio of lithium in the lithium manganese oxide, and $0 \leq a \leq 0.2$, more preferably $0 \leq a \leq 0.1$.

The b represents a molar ratio of the doping element $M^1$ in the lithium manganese oxide, and $0 < b \leq 0.5$, more preferably $0.03 \leq b \leq 0.25$. When the molar ration b of the $M^1$ satisfies the above range, a structurally stable positive electrode active material may be obtained while minimizing the deterioration of capacity.

The c represents a molar ratio of the A element in the lithium manganese oxide, and $0 \leq c \leq 0.1$, more preferably $0.01 \leq c \leq 0.05$.

The lithium manganese oxide represented by Formula 1 above includes the doping element $M^1$ having a low oxidation number, so that the average oxidation number of Mn ions is increased. Thereby, structural deformation (Jahn-Teller distortion) due to $Mn^{3+}$ during charging/discharging may be minimized.

Next, the coating layer is to suppress the generation of gas during charging/discharging by blocking the contact between the lithium manganese oxide and the electrolyte, and to prevent Mn elution at a high temperature. The coating layer is positioned on the surface of the lithium manganese oxide and includes one or more elements (hereinafter, referred to as a 'coating element') selected from the group consisting of Al, Ti, W, B, F, P, Mg, Ni, Co, Fe, Cr, V, Cu, Ca, Zn, Zr, Nb. Mo, Sr, Sb, Bi, Si, and S. Preferably, the coating layer may include one or more elements selected from the group consisting of Al, Ti, Zn, W, and B, more preferably one or more elements selected from the group consisting of B, W, and Al.

According to one embodiment, in the first positive electrode active material, the doping element $M^1$ may be one or more selected from Al, Li, Mg, and Zn, and the coating layer may include $Al_2O_3$.

According to another embodiment, in the first positive electrode active material according to the present invention, the doping element $M^1$ may be one or more selected from Al, Li, Mg, and Zn, and the coating layer may include Ti.

According to yet another embodiment, in the first positive electrode active material according to the present invention, the doping element $M^1$ may be one or more selected from Al, Li, Mg, and Zn, and the coating layer may include W.

According to yet another embodiment, in the first positive electrode active material according to the present invention, the doping element $M^1$ may be one or more selected from Al, Li, Mg, and Zn, and the coating layer may include B.

According to yet another embodiment, in the first positive electrode active material according to the present invention, the doping element $M^1$ may be one or more selected from Al, Li, Mg, and Zn, and the coating layer may include B and Al.

Meanwhile, the coating layer may be formed continuously or discontinuously on the surface of the lithium manganese oxide represented by [Formula 1] above.

For example, the coating layer may be formed in a form in which particles containing the coating elements are discontinuously attached to the surface of the lithium manganese oxide. At this time, the particles containing the coating elements may be oxide particles such as ZnO, $Al_2O_3$, $TiO_2$, $WO_3$, MgO, CaO, $B_2O_3$, $NbO_2$, SrO, CrO, $Mo_2O_5$, $Bi_2O_3$, and SiO. When oxide particles as described above are present on the surface of the lithium manganese oxide, the oxide particles capture and decompose HF formed by a reaction with the electrolyte as shown in Reaction Equation 1, so that Mn elution due to HF is suppressed.

$$ZnO + 2HF \rightarrow ZnF_2 + H_2O$$

$$Al_2O_3 + 6HF \rightarrow 2AlF_3 + 3H_2O \quad \text{[Reaction Equation 1]}$$

Alternatively, the coating layer may be formed in the form of a film containing the coating elements on the surface of the lithium manganese oxide. When the coating layer is formed in the form of a film, the effect of blocking contact between the electrolyte and the lithium manganese oxide and the effect of suppressing manganese elution are even better. Preferably, the film includes one or more elements selected from the group consisting of B, P, F, W, S, and Al. When a film as described above is formed on the surface of the lithium manganese oxide, the contact with the electrolyte is blocked by the film, so that a side reaction with the electrolyte and the generation of gas may be suppressed.

Meanwhile, the coating layer may be formed in a region corresponding to 50-100% of the total surface area of the lithium manganese oxide, preferably in a region corresponding to 80-100%, more preferably in a region corresponding to 90-100%. When the forming area of the coating layer satisfies the above range, the contact between the electrolyte and the lithium manganese oxide may be effectively blocked.

Also, the coating layer may have a thickness of 1 nm to 1000 nm, for example, 1 nm to 100 nm, or 10 nm to 1000 nm. When the coating layer is formed in the form of a film, the thickness thereof may be 1 nm to 100 nm, and when formed in the form of an oxide particle phase, the thickness thereof may be 10 nm to 1000 nm. When the thickness of the coating layer satisfies the above range, manganese elution and the generation of a side reaction with the electrolyte may be effectively suppressed while minimizing the deterioration of electrical performance.

Meanwhile, the first positive electrode active material of the present invention may include the doping element $M^1$ in a range of 500-40000 ppm, preferably 2500 to 40000 ppm, more preferably 5000 to 40000 ppm, most preferably 7000 to 20000 ppm based on the total weight of the first positive electrode active material. When the content of the doping element $M^1$ satisfies the above range, manganese elution at a high temperature may be effectively suppressed, and accordingly, a lithium secondary battery with excellent high-temperature storage properties may be implemented.

According to one embodiment, the first positive electrode active material may include Al, Li, Mg, or Zn, or a combination thereof as a doping element. At this time, the Al may be included in a range of 2500 to 40000 ppm, preferably 7000 to 20000 ppm based on the total weight of the first positive electrode active material, and the Li may be included in a range of 500 to 12000 ppm, preferably 1000 to 3000 ppm based on the total weight of the first positive electrode active material. Also, the Mg may be included in a range of 1000 to 20000 ppm, preferably 3000 to 10000 ppm based on the total weight of the first positive electrode active material, and the Zn may be included in a range of 1000 to 20000 ppm, preferably 3000 to 10000 ppm based on the total weight of the first positive electrode active material.

Meanwhile, the first positive electrode active material according to the present invention may have an average particle diameter ($D_{50}$) of 1-20 μm, for example, 1-8 μm, 7 μm to 20 μm, 8 μm to 20 μm, or 10 μm to 20 μm.

According to one embodiment, the first positive electrode active material according to the present invention may have an average particle diameter ($D_{50}$) of 1-8 μm. When the average particle diameter ($D_{50}$) satisfies the above range, by increasing the content of doping and coating elements compared to particles having a greater average particle size and controlling firing conditions and the like to reduce a specific surface area, a first positive electrode actively material with excellent structural stability and fewer side reactions with an electrolyte may be prepared.

According to another embodiment, the first positive electrode active material according to the present invention may have an average particle diameter ($D_{50}$) of 8 μm to 20 μm. When the average particle diameter ($D_{50}$) satisfies the above range, there is an advantage in that manganese elution is relatively less compared to particles having a small average particle diameter.

Also, the lithium manganese-based first positive electrode active material may have a specific surface area of 0.1 to 1.5 $m^2/g$. The specific surface area may be controlled according to the particle diameter of a lithium manganese-based first positive electrode active material. For example, when the average particle diameter ($D_{50}$) of the lithium manganese-based first positive electrode active material is 1-8 μm, the specific surface area may be 0.5-1.5 $m^2/g$ or 0.7-1.1 $m^2/g$, and when the average particle diameter ($D_{50}$) is 8-20 μm, the specific surface area may be 0.1-1 $m^2/g$ or 0.25-0.7 $m^2/g$.

Also, the first positive electrode active material may be in the form of a secondary particle formed by agglomerating a primary particle or a plurality of primary particles. The secondary particle may be formed, for example, by agglomerating 2-100, or 2-50 primary particles.

Meanwhile, in the first positive electrode active material, unintended impurities may be included in the preparation process. Such impurities may include, for example, Fe, Ni, Na, Cu, Zn, Cr, Ca, K, S, Mg, Co, Si, or B, or a combination thereof. When the content of such impurities is high, negative electrode dendrite is induced, so that battery life may be deteriorated, or a low-voltage defect due to internal short circuit may be generated. Also, there is a problem in that impurities such as S among the above impurities corrode an Al current collector. Therefore, it is preferable that the impurities are controlled to a predetermined degree or less.

For example, the first positive electrode active material according to the present invention may include S impurities to 20000 ppm or less, preferably 15000 ppm or less, more preferably 1000 ppm or less, and other impurities to 400 ppm or less, preferably 10 ppm or less.

Also, it is preferable that the first positive electrode active material according to the present invention includes magnetic impurities such as Fe, Cr, Ni, and Zn to 800 ppb or less in total, specifically 25 ppb or less. When the content of magnetic impurities is high, negative electrode dendrite is induced, so that battery life may be deteriorated, or a low-voltage defect due to internal short circuit may be generated.

Meanwhile, the lithium manganese-based first positive electrode active material as described above may be prepared by 1) forming a lithium manganese oxide doped with $M^1$ and represented by Formula 1 above, and 2) forming a coating layer by mixing the lithium manganese oxide represented by Formula 1 above and a coating raw material and then subjecting the mixture to a heat treatment. Hereinafter, a method for preparing the first positive electrode active material of the present invention will be described in detail.

1) Forming Lithium Manganese Oxide Doped with $M^1$

The lithium manganese oxide doped with $M^1$ and represented by Formula 1 above may be prepared by (i) a method in which a manganese raw material, a doping raw material including $M^1$, and a lithium raw material are mixed and then fired, or by (ii) a method in which a manganese raw material is reacted with a doping raw material including $M^1$ to prepare a manganese precursor doped with $M^1$, and then the manganese precursor doped with $M^1$ and a lithium raw material are mixed and then fired. That is, in the present invention, the doping element $M^1$ may be introduced in the forming step of a manganese precursor, or in the firing step of a manganese raw material and a lithium raw material.

At this time, the manganese raw material may be a manganese element-containing an oxide, a hydroxide, an oxyhydroxide, a carbonate, a sulfate, a halide, a sulfide, an acetate, or a carboxylate, or a combination thereof, specifically $MnO_2$, $MnCl_2$, $MnCO_3$, $Mn_3O_4$, $MnSO_4$, $Mn_2O_3$, $Mn(NO_3)_2$, and the like, but is not limited thereto.

The doping raw material including $M^1$ may be an $M^1$-containing an oxide, a hydroxide, an oxyhydroxide, a sulfate, a carbonate, a halide, a sulfide, an acetate, or a carboxylate, or a combination thereof, for example, $Al_2(SO_4)_3$, $AlCl_3$, Al-isopropoxide, $AlNO_3$, Li(OH), $LiCO_3$, $Li_2O$, MgO, Mg(OH)$_2$, $MgSO_4$, $Mg(NO_3)_2$, and the like, but is not limited thereto.

The lithium raw material may be a lithium-containing carbonate (e.g., lithium carbonate, etc.), a hydrate (e.g. lithium hydroxide I hydrate (LiOH·H$_2$O), etc.), a hydroxide (e.g. lithium hydroxide, etc.), a nitrate (e.g., lithium nitrate (LiNO$_3$), etc.), a chloride (e.g., lithium chloride (LiCl), etc.) and the like, but is not limited thereto.

According to one embodiment, a lithium manganese oxide represented by [Formula 1] above may be prepared by mixing a manganese raw material, a doping raw material including $M^1$, and a lithium raw material and then firing the mixture.

The manganese raw material, the doping raw material including $M^1$, and the lithium raw material may be mixed in an amount such that the molar ratio of Mn, $M^1$, and Li of [Formula 1] is satisfied.

Also, the mixing may be performed by solid-phase mixing or liquid-phase mixing. When components are mixed through solid-phase mixing, a firing process may be performed without a separate drying process. When components are mixed through liquid-phase mixing, a firing process is performed after spray drying the mixed components. When a solid-phase mixing is used, a lithium manganese oxide of a small particle diameter having an average particle diameter ($D_{50}$) of less than 8 μm, preferably 6 μm or less and having a small specific surface area may be obtained. On the other hand, when a liquid-phase mixing method is used, a lithium manganese oxide of a large particle diameter having an average particle diameter ($D_{50}$) of 8 μm or greater is usually obtained.

Meanwhile, the firing may be performed at 600-900° C., preferably 700-800° C. for 5-24 hours, preferably 10-15 hours.

For example, the firing may be performed at 750-850° C., preferably 780-830° C. for 5-24 hours, preferably 10-15 hours. When the firing temperature and time conditions are satisfied, the size of a primary particle is increased due to over-firing, and thus a lithium manganese oxide in which an average particle diameter ($D_{50}$) of a primary particle is 1 μm, preferably 2-3 μm may be obtained.

According to another embodiment, a lithium manganese oxide represented by [Formula 1] above may be prepared by reacting a manganese raw material with a doping raw material including $M^1$ to prepare a manganese precursor doped with $M^1$, and mixing the manganese precursor doped with $M^1$ and a lithium raw material and then firing the mixture (method (ii)).

Specifically, the manganese precursor doped with $M^1$ may be formed, for example, by subjecting a manganese raw material and a doping raw material including $M^1$ to a co-precipitation reaction. The manganese raw material and the doping raw material including $M^1$ are the same as described above.

The co-precipitation reaction may be performed by a co-precipitation method well known in the art, and for example, may be performed by introducing a manganese raw material and a doping raw material in a co-precipitation reactor at an appropriate ratio, and advancing a reaction by introducing an ammonia aqueous solution as a complexing agent and an alkaline aqueous solution as a pH adjusting agent.

When a manganese precursor doped with $M^1$ is generated through the co-precipitation reaction as described above, the manganese precursor doped with $M^1$ and a lithium raw material are mixed and then fired to form a lithium manganese oxide.

The manganese precursor doped with $M^1$ and the lithium raw material may be mixed in an amount such that the molar ratio of Mn, $M^1$, and Li of [Formula 1] is satisfied.

Meanwhile, the mixing and firing may be performed in the same manner as described in the method (i).

2) Forming Coating Layer

When the lithium manganese oxide doped with $M^1$ and represented by [Formula 1] is prepared through the above method, a coating layer including one or more elements (hereinafter, referred to as a 'coating element') selected from the group consisting of Al, Ti, W, B, F, P, Mg, Ni, Co, Fe, Cr, V, Cu, Ca, Zn, Zr, Nb. Mo, Sr, Sb, Bi, Si, and S is formed on the surface of the lithium manganese oxide of [Formula 1] above.

The formation of the coating layer may be performed by a method known in the art. For example, a wet coating method, a dry coating method, a plasma coating method, Atomic Ayer Deposition (ALD) or the like may be used.

The wet coating method may be performed, for example, by adding a suitable solvent such as ethanol, water, methanol, acetone, and the like to a lithium manganese oxide and a coating raw material, and mixing the mixture until the solvent disappears.

The drying coating method may be performed, for example, by mixing a lithium manganese oxide and a coating raw material in a solid phase without a solvent. For example, a grinder mixing method or a mechano fusion method may be used.

Meanwhile, the coating raw material may be an oxide, a hydroxide, an oxyhydroxide, a carbonate, a sulfate, a halide, a sulfide, an acetate, or a carboxylate, or a combination thereof each including one or more elements (hereinafter, referred to as a 'coating element') selected from the group consisting of Al, Ti, W, B, F, P, Mg, Ni, Co, Fe, Cr, V, Cu, Ca, Zn, Zr, Nb. Mo, Sr, Sb, Bi, Si, and S, for example, ZnO, $Al_2O_3$, $Al(OH)_3$, $AlSO_4$, $AlCl_3$, Al-isopropoxide, $AlNO_3$, $TiO_2$, $WO_3$, AlF, $H_2BO_3$, $HBO_2$, $H_3BO_3$, $H_2B_4O_7$, $B_2O_3$, $C_6H_5B(OH)_2$, $(C_6H_5O)_3B$, $[(CH_3(CH_2)_3O)_3B$, $C_3H_9B_3O_6$, $(C_3H_7O_3)B$, $Li_3WO_4$, $(NH_4)_{10}W_{12}O_{41} \cdot 5H_2O$, $NH_4H_2PO_4$ and the like, but is not limited thereto.

After the coating raw material is attached to the surface of the lithium manganese oxide through the above method, a coating layer may be formed through a heat treatment. At this time, the heat treatment may be performed at 100-700° C., preferably 300-450° C. for 1-15 hours, preferably 3-8 hours.

(2) Second Positive Electrode Active Material

The positive electrode of the present invention includes a lithium nickel-manganese-cobalt-based second positive active material together with the first positive electrode active material.

Specifically, the second positive electrode active material may be a lithium nickel-manganese-cobalt oxide represented by [Formula 2] below.

$$Li_{1+x}[Ni_yCo_zMn_wM^2_v]O_{2-p}X_p \qquad \text{[Formula 2]}$$

In Formula 2 above, $M^2$ is a doping element substituted for a transition metal (Ni, Co, Mn) site, and may be one or more elements selected from the group consisting of W, Cu, Fe, V, Cr, Ti, Zr, Zn, Al, In, Ta, Y, In, La, Sr, Ga, Sc, Gd, Sm, Ca, Ce, Nb, Mg, B, and Mo. Preferably, the $M^2$ may be one or more selected from the group consisting of Al, Zr, W, Ti, Nb, and B.

The B is an element substituted for an oxygen site in the lithium nickel-manganese-cobalt-based positive electrode active material, and may be one or more elements selected from the group consisting of F, Cl, Br, I, At, and S.

Meanwhile, the 1+x represents a molar ratio of lithium in the lithium nickel-manganese-cobalt-based positive electrode active material, and $0 \le x \le 0.3$, preferably $0 \le x \le 0.2$, more preferably $0 \le x \le 0.1$.

The y represents a molar ratio of nickel in the lithium nickel-manganese-cobalt-based positive electrode active material, and $0.5 \le y < 1$, preferably $0.65 \le y < 1$, more preferably $00.7 \le y < 1$, most preferably $0.75 \le y < 1$.

The z represents a molar ratio of cobalt in the lithium nickel-manganese-cobalt-based positive electrode active material, and $0 < z < 0.35$, preferably $0 < z \le 0.3$.

The w represents a molar ratio of manganese in the lithium nickel-manganese-cobalt-based positive electrode active material, and $0 < w < 0.35$, preferably $0 < w \le 0.3$.

When the molar ratio y, z, and w of transition metals in the lithium nickel-manganese-cobalt-based positive electrode active material satisfies the above range, a positive electrode active material with excellent energy density may be obtained.

The v represents a molar ratio of the doping element $M^2$ in the lithium nickel-manganese-cobalt-based oxide, and $0 \le v \le 0.1$, preferably $0.0005 \le v \le 0.08$, more preferably $0.001 \le v \le 0.02$, most preferably $0.002 \le v \le 0.01$. When the molar ratio of the doping element $M^2$ in the lithium nickel-manganese-cobalt-based oxide satisfies the above range, a positive electrode active material with excellent high-temperature stability may be obtained.

The p represents a molar ratio of the B element in the lithium nickel-manganese-cobalt-based oxide, and $0 \le p \le 0.1$, more preferably $0 \le p \le 0.05$.

More specifically, the lithium nickel-manganese-cobalt-based oxide represented by [Formula 2] may be $Li_{1+x}[Ni_yCo_zMn_w]O_2$, $Li_{1+x}[Ni_yCo_zMn_wAl_v]O_2$ and the like, but is not limited thereto.

Meanwhile, the second positive electrode active material may include a coating layer including at least one coating element selected from the group consisting of one or more elements selected from the group consisting of Al, Ti, W, B, F, P, Mg, Ni, Co, Fe, Cr, V, Cu, Ca, Zn, Zr, Nb. Mo, Sr, Sb, Bi, Si, and S. When the coating layer is included as described above, the contact between the second positive electrode active material and an electrolyte included in a lithium secondary battery is blocked, thereby suppressing the generation of a side reaction, so that when applied to a battery, lifespan properties may be improved, and also, the filling density of the positive active material may be increased.

When a coating element is additionally included as described above, the content of the coating element in the coating layer may be 100 ppm to 10,000 ppm, preferably 200 ppm to 5,000 ppm based on the total weight of the second positive electrode active material. For example, when a coating element is included in the above range based on the total weight of the second positive electrode active material, the generation of a side reaction with an electrolyte may be even further suppressed, and when applied to a battery, lifespan properties may be further improved.

The coating layer may be formed on the entire surface of the second positive electrode active material, or may be partially formed. Specifically, when the coating layer is partially formed on the surface of the second positive active material, the coating layer may be formed in an area of 50-100% of the total surface area of the second positive electrode active material, preferably 80-100%.

The average particle diameter ($D_{50}$) of the second positive electrode active material may be 1 μm to 20 μm, 2 μm to 10 μm, or 8 μm to 20 μm. When the average particle diameter ($D_{50}$) of the second positive electrode active material satisfies the above range, excellent electrode density and energy density may be implemented.

The grain size of the second positive electrode active material may be 200 nm to 500 nm. When the grain size of the second positive electrode active material satisfies the above range, excellent electrode density and energy density may be implemented.

Meanwhile, the content of transition metal elements in an active material particle of the second positive electrode active material may be constant regardless of the position, or the content of one or more metal elements may be changed depending on the position inside the particle. For example, at least one of Ni, Mn, Co, and $M^2$ of the second positive electrode active material may have a concentration gradient gradually changing. The 'gradually changing concentration gradient' may mean that the components are present in a concentration distribution in which the concentration changes successively in a stepwise manner in the entire particle or in a specific region.

Meanwhile, the second positive electrode active material may be a commercially available lithium nickel-cobalt-manganese-based positive electrode active material which has been purchased to be used, or may be one prepared by a method known in the art for preparing a lithium nickel-cobalt-manganese-based positive electrode active material.

For example, the lithium nickel-cobalt-manganese-based positive electrode active material represented by Formula 2 above may be prepared by a method in which a nickel-cobalt-manganese-based precursor and a lithium raw material, and optionally a doping raw material are mixed and then fired.

The nickel-cobalt-manganese-based precursor may be a hydroxide of nickel manganese cobalt, an oxyhydroxide of nickel manganese cobalt, a carbonate of nickel manganese cobalt, or an organic complex of nickel manganese cobalt, or a hydroxide of nickel manganese cobalt, an oxyhydroxide of nickel manganese cobalt, a carbonate of nickel manganese cobalt, or an organic complex of nickel manganese cobalt all including a doping element $M^2$. For example, the nickel-cobalt-manganese-based precursor may be $[Ni_yCo_zMn_w]$ $(OH)_2$, $[Ni_yCo_zMn_wAl_v](OH)_2$, $[Ni_yCo_zMn_w]O\cdot OH$, $[Ni_yCo_zMn_wAl_v]O\cdot OH$ and the like, but is not limited thereto.

The lithium raw material may be a lithium-containing carbonate (e.g., lithium carbonate, etc.), a hydrate (e.g. lithium hydroxide I hydrate ($LiOH\cdot H_2O$), etc.), a hydroxide (e.g. lithium hydroxide, etc.), a nitrate (e.g., lithium nitrate ($LiNO_3$), etc.), a chloride (e.g., lithium chloride (LiCl), etc.) and the like, but is not limited thereto.

The doping raw material may be an oxide, a hydroxide, a sulfate, an oxyhydroxide, or a halide, or a combination thereof each including one or more elements selected from the group consisting of W, Cu, Fe, V, Cr, Ti, Zr, Zn, Al, In, Ta, Y, In, La, Sr, Ga, Sc, Gd, Sm, Ca, Ce, Nb, Mg, B, and Mo.

Meanwhile, the firing may be performed at 600-1000° C., preferably 700-900° C. for 5-30 hours, preferably 10-20 hours.

Meanwhile, when the second positive electrode active material includes a coating layer, a process may be additionally performed after the firing, the process in which a coating raw material is additionally mixed and then the mixture is subjected to a heat treatment.

The coating raw material may be an oxide, a hydroxide, an oxyhydroxide, a carbonate, a sulfate, a halide, a sulfide, an acetate, or a carboxylate, or a combination thereof each including one or more elements (hereinafter, referred to as a 'coating element') selected from the group consisting of Al, Ti, W, B, F, P, Mg, Ni, Co, Fe, Cr, V, Cu, Ca, Zn, Zr, Nb. Mo, Sr, Sb, Bi, Si, and S, for example, ZnO, $Al_2O_3$, $Al(OH)_3$, $Al_2(SO_4)_3$, $AlCl_3$, Al-isopropoxide, $AlNO_3$, $TiO_2$, $WO_3$, AlF, $H_2BO_3$, $HBO_2$, $H_3BO_3$, $H_2B_4O_7$, $B_2O_3$, $C_6H_5B(OH)_2$, $(C_6H_5)_3B$, $[(CH_3(CH_2)_3O)_3B$, $C_3H_9BO_3O_6$, $(C_3H_7O_3)$ B, $Li_3WO_4$, $(NH_4)_{10}W_{12}O_{41}\cdot 5H_2O$, $NH_4H_2PO_4$ and the like, but is not limited thereto.

The formation of the coating layer may be performed by a method known in the art. For example, a wet coating method, a dry coating method, a plasma coating method, Atomic Ayer Deposition (ALD) or the like may be used.

The heat treatment may be performed at 100-700° C., preferably 300-450° C. for 1-15 hours, preferably 3-8 hours.

The second positive electrode active material represented by [Formula 2] is a high-nickel positive electrode active material having a nickel ratio of greater than 50 mol %, and is excellent in energy density properties. Therefore, when the second positive electrode active material represented by [Formula 2] and the lithium manganese-based first positive electrode active material having a spinel structure of the present invention are mixed and used, the capacity problem, which is a disadvantage of the lithium-manganese-based first positive electrode active material, may be solved.

Meanwhile, in the present invention, the positive electrode may include a positive electrode active material having a bimodal particle diameter distribution including large diameter particles and small diameter particles having different average particle diameters ($D_{50}$).

Specifically, the positive electrode may include a positive electrode active material having a bimodal particle diameter distribution including large diameter particles having an average particle diameter ($D_{50}$) of 4 μm to 20 μm and small diameter particles having an average particle diameter ($D_{50}$) of 10% to 75% of the average particle diameter ($D_{50}$) of the large diameter particles, preferably 25% to 75%. When a positive electrode active material having a bimodal particle diameter distribution is used as described above, a positive electrode having high electrode density and energy density may be formed.

Preferably, the average particle diameter ($D_{50}$) of the large diameter particles may be 8 μm to 20 μm, 8 μm to 15 μm, or 12 μm to 20 μm, and the average particle diameter ($D_{50}$) of the small diameter particles may be 1 μm to 15 μm, 2 μm to 13 μm, 2 μm to 8 μm, or 4 μm to 13 μm.

According to one embodiment, a positive electrode material according to the present invention may have a bimodal particle diameter distribution including large diameter particles having an average particle diameter of 8 μm to 15 μm and small diameter particles having an average particle diameter of 1 μm to 6 μm.

According to another embodiment, a positive electrode material according to the present invention may have a bimodal particle diameter distribution including large diameter particles having an average particle diameter of 12 μm to 20 μm and small diameter particles having an average particle diameter of 4 μm to 13 μm.

Meanwhile, the type of an active material constituting the small particle diameter particles and the large diameter particles is not particularly limited, and may be the first positive electrode active material and/or the second positive electrode active material.

According to one embodiment, in the positive electrode of the present invention, the first positive electrode active material may be large diameter particles and the second positive electrode active material may be small particle diameter particles. In this case, the average particle diameter ($D_{50}$) of the first positive electrode active material may be 8 μm to 20 μm, preferably 12 μm to 20 μm, and the average particle diameter ($D_{50}$) of the second positive electrode active material may be 1 μm to 15 μm, preferably 4 μm to 13 μm. When large diameter particles satisfying the above range are used as a first positive electrode active material, manganese elution in the first positive electrode active material may be more effectively suppressed, and thus, the high-temperature stability of a battery may be further improved.

According to another embodiment, in the positive electrode of the present invention, the first positive electrode active material may be small particle diameter particles and the second positive electrode active material may be large diameter particles. In this case, the average particle diameter ($D_{50}$) of the first positive electrode active material may be 1 μm to 15 μm, preferably 1 μm to 8 μm, and the average particle diameter ($D_{50}$) of the second positive electrode active material may be 8 μm to 20 μm, preferably 8 μm to 15 μm. When small particle diameter particles satisfying the above range are used as a first positive electrode active material, the doping and/or coating content of the first positive electrode active material may be applied high, and a side reaction with an electrolyte may be minimized by allowing a low BET value.

According to yet another embodiment, in the positive electrode of the present invention, at least one of the first positive electrode active material and the second positive electrode active material may have a bimodal particle diameter distribution including the large diameter particles and the small particle diameter particles.

Meanwhile, the positive electrode may include the first positive electrode active material and the second positive electrode active material at a weight ratio of 10:90 to 90:10, preferably 40:60 to 60:40. When the mixing ratio of a first positive electrode active material and a second positive electrode active material satisfies the above range, an electrode having excellent high-temperature storage and capacity properties may be obtained.

Meanwhile, according to one embodiment, a positive electrode according to the present invention may include a positive electrode current collector and a positive electrode active material layer formed on the positive electrode current collector, wherein the positive electrode active material layer may include a lithium manganese-based first positive electrode active material and a lithium nickel-manganese-cobalt-based second positive electrode active material. At this time, the positive electrode active material layer may further include a binder and/or a conductive agent if necessary.

The specific contents of the first positive electrode active material and the second positive electrode active material are the same as those described above, and thus, a detailed description thereof will be omitted.

The total weight of the first positive electrode active material and the second positive electrode active material may be 80-99 wt %, more specifically 85-98.5 wt % based on the total weight of the positive electrode active material layer. When the positive electrode active material is included in the above range, excellent capacity properties may be exhibited.

The positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on a surface of the positive electrode current collector to improve the adhesion of a positive electrode material. For example, the positive electrode current collector may be used in various forms such as a film, a sheet, a foil, a net, a porous body, a foam, a non-woven body, and the like.

The conductive agent is used to impart conductivity to an electrode, and any conductive agent may be used without particular limitation as long as it has electron conductivity without causing a chemical change in a battery to be constituted. Specific examples of the conductive agent may include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. The conductive agent may be included in an amount of 0.1 wt % to 15 wt % based on the total weight of a positive electrode active material layer.

The binder serves to improve the bonding between positive electrode active material particles and the adhesion between the positive electrode active material and the current collector. Specific examples of the binder may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 0.1-15 wt % based on the total weight of a positive electrode active material layer.

Meanwhile, in the present invention, the positive electrode active material layer may have a single-layered structure, or may have a multi-layered structure in which 2 or more layers are laminated. For example, the positive electrode may include a first positive electrode active material layer formed on a positive electrode current collector and a second positive electrode active material layer formed on the first positive electrode active material layer.

Also, in the present invention, the first positive electrode active material and the second positive electrode active material may be included in the same layer, or different layers.

Also, the first positive electrode active material and the second positive electrode active material may have different compositions. Here, 'have different compositions' mean that the type and/or content of one or more components among the components (for example, a positive electrode active material, a conductive agent, binder, and the like) included in each layer are different.

According to one embodiment, the first positive electrode active material layer and the second positive electrode active material layer may have different mixing ratios of a first positive electrode active material and a second positive electrode active material which are included in each layer For example, the first positive electrode active material layer may include the first positive electrode active material in an amount greater than that of the second positive electrode active material, and the second positive electrode active material layer may include the second positive electrode active material in an amount greater than that of the first positive electrode active material. That is, the first positive electrode active material layer may include a lithium manganese-based first positive electrode active material in an amount of 50-100 wt %, preferably 70-100 wt % based on the total positive electrode active materials included in a first positive electrode active material layer, and the second positive electrode active material layer may include a lithium nickel-cobalt-manganese-based second positive electrode active material in an amount of 50-100 wt %, preferably 70-100 wt % of the total positive electrode active materials included in a second positive electrode active material layer. When a lithium manganese-based active material having a spinel structure is included in a high content in a first positive electrode active material layer positioned at a lower portion having a long lithium ion transfer path, output properties may be further improved.

Alternatively, the first positive electrode active material layer may include the second positive electrode active material in an amount greater than that of the first positive electrode active material, and the second positive electrode active material layer may include the first positive electrode active material in an amount greater than that of the second positive electrode active material. That is, the first positive electrode active material layer may include a lithium nickel-cobalt-manganese-based second positive electrode active material in an amount of 50-100 wt %, preferably 70-100 wt % based on the total positive electrode active materials included in a first positive electrode active material layer, and the second positive electrode active material layer may include a lithium manganese-based first positive electrode active material having a spinel structure in an amount of 50-100 wt %, preferably 70-100 wt % of the total positive electrode active materials included in a second positive electrode active material layer. Since a lithium nickel-cobalt-manganese-based positive electrode active material has a high tap density, thereby having an excellent rolling rate, when a lithium nickel-cobalt-manganese-based positive electrode active material is included in a high content in a first positive electrode active material layer positioned in a lower portion, the adhesion to a current collector is improved, and thus, output and lifespan may be also improved.

According to another embodiment, the first positive electrode active material layer and the second positive electrode active material layer may be different in the content of a binder included in each layer. Specifically, the first positive electrode active material layer may include a binder in an amount of 1-4 wt %, preferably 1.5-4 wt %, and the second positive electrode active material layer may include a binder in an amount of 3 wt % or less, preferably 0.5-2 wt %.

The above-described positive electrode according to the present invention has a high loading amount and a high electrode density, thereby having excellent energy density properties. Specifically, the positive electrode may have a loading amount of 3.0 mAh/cm$^2$ to 20 mAh/cm$^2$, preferably 3.6-6.0 mAh/cm$^2$, more preferably 4.0-5.0 mAh/cm$^2$.

The positive electrode of the present invention may be manufactured according to a typical method for manufacturing a positive electrode except that a specific positive electrode active material according to the present invention is used. Specifically, the positive electrode may be manufactured by applying a positive electrode mixed material, which is prepared by dissolving or dispersing a positive electrode active material, a binder and/or a conductive agent in a solvent, on a positive electrode current collector, followed by drying and rolling.

The solvent may be a solvent commonly used in the art. Examples of the solvent may include dimethyl sulfoxide (DMSO), isopropyl alcohol, N-methylpyrrolidone (NMP), acetone, or water, and any one thereof or a mixture of two or more thereof may be used. The amount of the solvent used is sufficient if the solvent may dissolve or disperse the positive electrode active material, the conductive agent, and the binder in consideration of an applying thickness of a slurry and preparing yield, and may allow to have a viscosity capable of exhibiting excellent thickness uniformity during the subsequent applying for the preparing of the positive electrode.

Also, as another method, the positive electrode may be prepared by casting the composition for forming a positive electrode active material layer on a separate support and then laminating a film separated from the support on the positive electrode current collector.

(2) Negative Electrode

Next, a negative electrode will be described.

The negative electrode according to the present invention includes artificial graphite having a specific surface area (BET) of 0.1-1.2 m$^2$/g and one or more selected from the group consisting of natural graphite and soft carbon which have a greater specific surface area than the artificial graphite.

According to research by the present inventors, when a negative electrode including artificial graphite having a specific surface area (BET) of 0.1-1.2 m$^2$/g is used as a negative electrode of a lithium secondary battery to which a positive electrode including a lithium manganese-based first positive electrode active material having a spinel structure and a lithium nickel-manganese-cobalt-based second positive active material are applied, battery properties at a high temperature was excellent when compared with a case in which a negative electrode including a different kind of negative electrode active material was used. Particularly, it was found that the effect of suppressing resistance increase was excellent even after long-term storage at a high temperature.

Specifically, the artificial graphite may have a specific surface area (BET) of 0.1-1.2 m$^2$/g, preferably 0.3-1.0 m$^2$/g, more preferably 0.5-1.0 m$^2$/g. When the specific surface area of artificial graphite is less than 0.12 m$^2$/g or greater than 1.2 m$^2$/g, the effect of suppressing resistance increase after long-term storage at a high temperature was found to be insignificant.

Also, when artificial graphite having a certain specific surface area as described above and one or more selected from the group consisting of natural graphite and soft carbon which have a greater specific surface area than the artificial graphite are mixed and used, negative electrode adhesion is increased so that the deterioration of electrode performance due to the de-intercalation of active materials may be effectively prevented.

At this time, the soft carbon may have a specific surface area (BET) of 7-10 m$^2$/g, preferably 8-10 m$^2$/g. When the specific surface area of soft carbon satisfies the above range, the effect of improving high-temperature storage properties and high-temperature lifespan properties may be more excellent.

Also, the natural graphite may have a specific surface area (BET) of 2-5 m$^2$/g, preferably 2.5-4.0 m$^2$/g, more preferably 2.5-3.5 m$^2$/g. When the specific surface area of natural graphite satisfies the above range, the effect of the improvement of high-temperature storage properties and high-temperature lifespan properties may be more excellent.

According to one embodiment, the negative electrode may include the artificial graphite and the soft carbon at a weight ratio of 50:50-95:5, preferably 60:40-95:5, more preferably 70:30-90:10. When the mixing ratio of artificial graphite and soft carbon satisfies the above range, the effect of improving lifespan and the effect of suppressing resistance increase after high-temperature storage are even more excellent.

According to another example, the negative electrode may include the artificial graphite and the natural graphite at a weight ratio of 50:50-95:5, preferably 60:40-95:5, more preferably 70:30-90:10. When the mixing ratio of artificial graphite and natural graphite satisfies the above range, the effect of improving lifespan and the effect of suppressing resistance increase after high-temperature storage are even more excellent.

Meanwhile, the negative electrode may include a negative electrode current collector and a negative electrode active material layer position on the negative electrode current collector, and negative electrode active material layer may include, as a negative electrode active material, artificial graphite having a specific surface area (BET) of 0.1-1.2 m$^2$/g and at least one selected from the group consisting of natural graphite and soft carbon which have a greater specific surface area than the artificial graphite. Also, the negative electrode active material layer may further include a binder and a conductive agent optionally in addition to the artificial graphite, natural graphite, and soft carbon.

At this time, the total weight of the artificial graphite, soft carbon, and natural graphite may be 80-99 wt % based on the total weight of the negative electrode active material layer.

Since artificial graphite, natural graphite, and soft carbon have been described above, the remaining components will be described below.

The negative electrode current collector is not particularly limited as long as it has high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode collector may typically have a thickness of 3 µm to 500 µm, and as in the case of the positive electrode current collector, microscopic irregularities may be formed on a surface of the negative electrode current collector to improve the adhesion of a negative electrode active material. For example, the negative electrode current collector may be used in various forms such as a film, a sheet, a foil, a net, a porous body, a foam, a non-woven body, and the like.

The binder is a component for assisting in bonding between a conductive agent, an active material, and a current collector, and is typically added in an amount of 0.1 wt % to 10 wt % based on the total weight of a negative electrode active material layer. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber, nitrile-butadiene rubber, fluorine rubber, various copolymers thereof, and the like.

The conductive material is a component for further improving the conductivity of a negative electrode active material, and may be added in an amount of 10 wt % or less, preferably 5 wt % or less based on the total weight of a negative electrode active material layer. The conductive agent is not particularly limited as long as it has conductivity without causing a chemical change in the battery. Examples of the conductive agent may include graphite such as natural graphite or artificial graphite; carbon black such as acetylene black, Ketjen black, channel black, furnace black, lamp black, and thermal black; conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used.

The negative electrode active material layer may be prepared by applying, on a negative electrode current collector, a negative electrode active material which has been prepared by dissolving or dispersing a negative electrode active material and optionally a binder and a conductive agent in a solvent, and the drying the negative electrode material applied on the current collector. Alternatively, a negative electrode may be manufactured by casting the negative electrode material on a separate support, and then laminating a film peeled off from the support on a negative electrode current collector.

Meanwhile, the negative electrode active material layer may have a single-layered structure, or may have a multi-layered structure in which 2 or more layers are laminated. For example, the negative electrode may include a negative electrode current collector, a first negative electrode active material layer formed on the negative electrode current collector, a second negative electrode active material layer formed on the first negative electrode active material layer, and the first negative electrode active material layer and the second negative electrode active material layer may have different compositions. That is, the type and/or content of each component in the first negative electrode active material layer and the second negative electrode active material layer may be different from each other. For example, the first negative electrode active material layer and the second negative electrode active material layer may have a different content of artificial graphite, soft carbon, natural graphite, and/or a binder.

Meanwhile, the negative electrode may have a loading amount of 300-500 mg/25 $cm^2$, preferably 300-400 mg/25 $cm^2$. When the loading amount of a negative electrode satisfies the above range, sufficient electrode adhesion is secured, so that processing is facilitated, a battery having excellent rapid charging performance and resistance performance may be implemented, and energy density may be maximized.

(3) Separator

A separator is to separate a negative electrode and a positive electrode and to provide a movement path for lithium ions. Any separator may be used without particular limitation as long as it is typically used as a separator in a secondary battery. Particularly, a separator having high moisture-retention ability for an electrolyte as well as low resistance to the movement of electrolyte ions is preferable.

Specifically, as a separator, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used as the separator. Also, a coated separator including a ceramic component or a polymer material may be used to secure heat resistance or mechanical strength, and may be selectively used having a single layered or a multi-layered structure.

(4) Electrolyte

An electrolyte used in the present invention may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the manufacturing of a secondary battery, but is not limited thereto.

Specifically, the electrolyte may include an organic solvent and a lithium salt.

Any organic solvent may be used as the organic solvent without particular limitation as long as it may serve as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R-CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used as the organic solvent. Among these solvents, a carbonate-based solvent is preferable, and a mixture of a cyclic carbonate (e.g., ethylene carbonate or propylene carbonate) having high ionic conductivity and high dielectric constant, which may increase charging/discharging performance of the battery, and a low-viscosity linear carbonate-based compound (e.g., ethylmethyl carbonate, dimethyl carbonate, or diethyl carbonate) is more preferable.

Any lithium salt may be used without particular limitation as long as it is typically used in an electrolyte for a lithium secondary battery. For example, the lithium salt may include $Li^+$ as positive ions, and at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^{-1}$, $CF_3CO_2^-$, $CH_3CO^-$, $SCN^-$, and $(CF_3CF_2SO_2)_2N^-$ as negative ions. Specifically, the lithium salt may include a single material selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, and $LiCH_3SO_3$, or a mixture of two or more thereof.

The content of the lithium salt may be appropriately changed within a range that is typically usable. Specifically, the lithium salt may be included in an electrolyte in a range of 0.8 M to 3 M, specifically 0.1 M to 2.5 M.

In the electrolyte, in order to improve the lifespan properties of a battery, suppress the reduction in battery capacity, and improve the discharge capacity of the battery, and the like, various additives may be used in addition to the electrolyte components. For example, as such additives, a halo-alkylene carbonate-based compound such as difluoroethylene carbonate; or pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may further be included, and the additives may be used alone or in combination. At this time, the additive may be included in an amount of 0.1 wt % to 5 wt % based on the total weight of an electrolyte.

The above lithium secondary battery according to the present invention may be usefully used in portable devices such as a mobile phone, a notebook computer, and a digital camera, and in electric cars such as a hybrid electric vehicle (HEV).

Therefore, according to another example of the present invention, a battery module including the lithium secondary battery as a unit cell and a battery pack including the same are provided.

The battery module or the battery pack may be used as a power source of at least one medium-and-large sized device such as a power tool; electric cars including an electric vehicle (EV), a hybrid electric vehicle (HEV), and a plug-in hybrid electric vehicle (PHEV); or a power storage system.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell used as a power source of a small-sized device, and may be preferably used as a unit cell in a medium- and large-sized battery module including a plurality of battery cells, as well.

MODE FOR CARRYING OUT THE INVENTION

Hereinafter, the present invention will be described in more detail with reference to Examples. However, the embodiments according to the present invention can be modified into various different forms, and the scope of the present invention should not be construed as being limited to the embodiments described below. The embodiments of the present invention are provided to more fully describe the present invention to those skilled in the art.

EXAMPLES

Preparation Example 1

$MnSO_4$, $Al_2(SO_4)_3$ and MgO were mixed at a weight ratio of 94.2:3.4:2.4, and then using distilled water which has been subjected to $N_2$ purging, $MnSO_4 \cdot 7H_2O$ containing $Al_2(SO_4)_3$ and MgO was prepared. The prepared $MnSO_4 \cdot 7H_2O$ was introduced into a continuous stirred tank reactor (CSTR, Manufacturer: EMS Tech Co., Product name: CSTR-L0) at a rate of 250 mL/h. While introducing 40% sodium hydroxide aqueous solution as an alkaline agent to the reactor through a sodium hydroxide aqueous solution supply of the reactor at a rate of 10 mL/h and introducing 25% ammonia solution through an ammonia solution supply of the reactor at a rate of 30 ml/h, a pH of 10.5 was maintained through a pH meter and a control unit. The temperature of the reactor was set to 40° C. and the residence time RT was adjusted to 10 hours, and stirring was performed at a rate of 1200 rpm such that $Mn_3O_4$ containing Al and Mg is precipitated. The obtained reaction solution was filtered through a filter and purified with distilled water. Thereafter, an additional process of drying was performed thereto prepare a manganese precursor $(Mn_{0.94}Al_{0.03}Mg_{0.03})_3O_4$ doped with Al and Mg. The above-prepared manganese precursor doped with Al and Mg and a lithium raw material $Li_2CO_3$ were mixed at a molar ratio of 1:0.75 and then fired at 810° C. for 14 hours to obtain a lithium manganese oxide $Li(Mn_{1.88}Al_{0.06}Mg_{0.06})O_4$.

Based on 100 parts by weight of the lithium manganese oxide prepared as described above, $WO_3$ was added in an amount of 3000 ppm and dry mixed, and then heat-treated at 600° C. for 5 hours to obtain a first positive electrode active material A having a coating layer containing W.

Preparation Example 2

Based on 100 parts by weight of the lithium manganese oxide $Li(Mn_{1.88}Al_{0.06}Mg_{0.06})O_4$ prepared according to the method of Preparation Example 1, $TiO_2$, instead of WO3, was added in an amount of 1000 ppm and dry mixed, and then heat-treated at 600° C. for 5 hours to obtain a first positive electrode active material B having a coating layer containing Ti.

Preparation Example 3

A manganese precursor $(Mn_{0.957}Li_{0.015}Al_{0.028})_3O_4$ doped with Li and Al was prepared in the same manner as in Preparation Example 1 except that $MnSO_4$, $Li_2CO_3$ and $Al_2(SO_4)_3$ were mixed at a weight ratio of 95:0.5:4.5 to prepare $(MnSO_4 \cdot 7H_2O)$ containing $Li_2CO_3$ and $Al_2(SO_4)_3$.

The above-prepared manganese precursor doped with Li and the lithium raw material $Li_2CO_3$ were mixed at a molar ratio of 1:0.75 and then fired at 810° C. for 14 hours to obtain a lithium manganese oxide $Li(Mn_{1.914}Li_{0.06}Al_{0.056})O_4$.

Based on 100 parts by weight of the lithium manganese oxide prepared as described above, $WO_3$ was added in an amount of 5000 ppm and dry mixed, and then heat-treated at 600° C. for 5 hours to obtain a first positive electrode active material C having a coating layer containing W.

Preparation Example 4

A manganese precursor $(Mn_{0.961}Li_{0.021}Mg_{0.018})_3O_4$ doped with Li and Mg was prepared in the same manner as in Preparation Example 1 except that $MnSO_4$, $Li_2CO_3$ and $MgSO_4$ were mixed at a weight ratio of 98:0.5:1.5 to prepare $(MnSO_4 \cdot 7H_2O)$ containing $Li_2CO_3$ and $MgSO_4$.

The above-prepared manganese precursor doped with Li and the lithium raw material $Li_2CO_3$ were mixed at a molar ratio of 1:0.75 and then fired at 810° C. for 14 hours to obtain a lithium manganese oxide $Li(Mn_{1.922}Li_{0.042}Mg_{0.036})O_4$.

Based on 100 parts by weight of the lithium manganese oxide prepared as described above, $WO_3$ was added in an amount of 5000 ppm and dry mixed, and then heat-treated at 600° C. for 5 hours to obtain a first positive electrode active material D having a coating layer containing W.

Preparation Example 5

$Li(Mn_{1.88}Al_{0.06}Mg_{0.06})O_4$ prepared in Preparation Example 1 was used as a positive electrode active material E without forming a coating layer.

Preparation Example 6

A lithium manganese oxide $Li(Mn_{1.88}Al_{0.08}Mg_{0.04})O_4$ was prepared in the same manner as in Preparation Example 1 except that $MnSO_4$, $Al_2(SO_4)_3$ and MgO were mixed at a weight ratio of 93.9:4.5:1.6, and was used as a positive electrode active material F without forming a coating layer.

Preparation Example 7

Based on 100 parts by weight of a lithium manganese oxide $LiMn_2O_4$, $WO_3$ was added in an amount of 5000 ppm and mixed, and then heat-treated at 600° C. for 5 hours to obtain a first positive electrode active material G having a coating layer containing W.

Example 1

A positive electrode active material, a conductive agent, and a binder were mixed in N-methylpyrrolidone as a solvent at a weight ratio of 96.25:1.0:1.5 to prepare a positive electrode material. At this time, the positive electrode active material A prepared in Preparation Example 1 and $Li[Ni_{0.86}Co_{0.07}Mn_{0.035}Al_{0.035}]O_2$ were mixed at a weight ratio of 55:45 and used as the positive electrode active material, and $Li_{435}$ of Denka Co. was used as the conductive agent. KF9700 of Kureha Co. and BM-730H of ZEON Co. were mixed at a weight ratio of 90:10 and used as the binder. The prepared positive electrode material was applied on an aluminum current collector having a thickness of 12 μm (product name: A1100, manufacturer: Sam-a Aluminum Co., Ltd.), dried at 130° C., and rolled to manufacture a positive electrode.

A negative electrode active material, a binder, CMC, and a conductive agent were mixed in N-methylpyrrolidone as a solvent in a weight ratio of 96.1:2.3:1.1:0.5 to prepare a negative electrode material. At this time, artificial graphite having a BET specific surface area of 0.740 $m^2/g$ (Model name: GT, Manufacturer: Zichen) and soft carbon having a BET specific surface area of 9.5 $m^2/g$ (Model name: PCT-240R, Manufacturer: Power carbon technology) were mixed at a weight ratio of 90:10 and used as the negative electrode active material, and BM-L203 of Zeon Co. was used as the binder. Super C65 of Imerys Co. was used as the conductive agent, and Daicell of Daicel Co. was used as the CMC. The prepared negative electrode material was applied on a copper current collector having a thickness of 82 μm (Manufacturer: LS Mtron Co.), dried at 65° C., and rolled to manufacture a negative electrode.

A separator was interposed between the positive electrode and the negative electrode both manufactured as above, and an electrolyte was injected to manufacture a coin cell.

Example 2

A coin cell was manufactured in the same manner as in Example 1 except that the positive electrode active material B prepared in Preparation Example 2 and $Li[Ni_{0.86}Co_{0.07}Mn_{0.035}Al_{0.035}]O_2$ were mixed at a weight ratio of 55:45 and used as the positive electrode active material.

Example 3

A coin cell was manufactured in the same manner as in Example 1 except that the positive electrode active material C prepared in Preparation Example 3 and $Li[Ni_{0.86}Co_{0.07}Mn_{0.035}Al_{0.035}]O_2$ were mixed at a weight ratio of 55:45 and used as the positive electrode active material.

Example 4

A coin cell was manufactured in the same manner as in Example 1 except that the positive electrode active material D prepared in Preparation Example 4 and $Li[Ni_{0.86}Co_{0.07}Mn_{0.035}Al_{0.035}]O_2$ were mixed at a weight ratio of 55:45 and used as the positive electrode active material.

Example 5

A coin cell was manufactured in the same manner as in Example 1 except that artificial graphite having a BET specific surface area of 0.740 $m^2/g$ (Model name: GT, Manufacturer: Zichen) and natural graphite having a BET specific surface area of 2.680 $m^2/g$ (Model name: PAS-C3B, Manufacturer: Posco Chemtec Co.) were mixed at a weight ratio of 90:10 and used as the negative electrode active material.

Comparative Example 1

A coin cell was manufactured in the same manner as in Example 1 except that the positive electrode active material E prepared in Preparation Example 5 and $Li[Ni_{0.86}Co_{0.07}Mn_{0.035}Al_{0.035}]O_2$ were mixed at a weight ratio of 55:45 and used as the positive electrode active material.

Comparative Example 2

A coin cell was manufactured in the same manner as in Example 1 except that the positive electrode active material F prepared in Preparation Example 6 and Li[Ni$_{0.86}$Co$_{0.07}$Mn$_{0.035}$Al$_{0.035}$]O$_2$ were mixed at a weight ratio of 55:45 and used as the positive electrode active material.

Comparative Example 3

A coin cell was manufactured in the same manner as in Example 1 except that the positive electrode active material G prepared in Preparation Example 7 and Li[Ni$_{0.86}$Co$_{0.07}$Mn$_{0.035}$Al$_{0.035}$]O$_2$ were mixed at a weight ratio of 55:45 and used as the positive electrode active material.

Comparative Example 4

A coin cell was manufactured in the same manner as in Example 1 except that LiMn$_2$O$_4$ not doped and coated and Li[Ni$_{0.86}$Co$_{0.07}$Mn$_{0.035}$Al$_{0.035}$]O$_2$ were mixed at a weight ratio of 55:45 and used as the positive electrode active material.

Comparative Example 5

A coin cell was manufactured in the same manner as in Example 1 except that natural graphite having a BET specific surface area of 2.680 m$^2$/g (Model name: PAS-C3B, Manufacturer: Posco Chemtec Co.) was used alone as the negative electrode active material.

Comparative Example 6

A coin cell was manufactured in the same manner as in Example 1 except that natural graphite having a BET specific surface area of 2.680 m$^2$/g (Model name: PAS-C3B, Manufacturer: Posco Chemtec Co.) and soft carbon having a BET specific surface area of 9.5 m$^2$/g (Model name: PCT-240R, Manufacturer: Power carbon technology) were mixed at a weight ratio of 90:10 and used as the negative electrode active material.

Experimental Example 1

High-Temperature Storage Properties (1)

The coin cells prepared in Examples 1-4 and Comparative Examples 1-4 were stored for 4 weeks at 60° C., and then the capacity retention rate and the resistance increase rate were measured.

Specifically, the coin cells prepared in Examples 1-4 and Comparative Examples 1-4 were fully charged to 4.2 V and stored for 4 weeks at 60° C. At the end of each week, the coin cells were charged to 4.2 V with a constant current of 0.33 C and then discharged to 2.5 V with a constant current of 0.33 C. The discharge capacity and the resistance at that time were measured, and then the discharge capacity and resistance after 4 weeks of storage were compared with the initial discharge capacity and the initial resistance to measure the capacity retention rate and the resistance increase rate. The measurement results are shown in Table 1 below.

TABLE 1

|  | Capacity retention rate (%) | Resistance increase rate (%) |
| --- | --- | --- |
| Example 1 | 72 | 185 |
| Example 2 | 68 | 215 |
| Example 3 | 67 | 219 |
| Example 4 | 66 | 218 |
| Comparative Example 1 | 69 | 221 |
| Comparative Example 2 | 67 | 250 |
| Comparative Example 3 | 63 | 257 |
| Comparative Example 4 | 62 | 261 |

As shown in Table 1, the coin cells of Examples 1-4 have a capacity retention rate after 4 weeks of storage at 60° C. equal to or higher than that of the coin cells of Comparative Examples 1-4, and have a resistance increase rate lower than that of the coin cells of Comparative Examples 1-4.

Experimental Example 2

High-Temperature Storage Properties (2)

The coin cells prepared in Examples 1 and 5, and Comparative Examples 5 and 6 were stored for 6 weeks at 60° C., and then the capacity retention rate and the resistance increase rate were measured.

Specifically, the coin cells prepared in Examples 1 and 5, and Comparative Examples 5 and 6 were fully charged to 4.2 V and stored for 6 weeks at 60° C. At the end of each week, the coin cells were charged to 4.2 V with a constant current of 0.1 C and then discharged to 3.0 V with a constant current of 0.1 C. The discharge capacity and the resistance at that time were measured, and then compared with the initial discharge capacity and the initial resistance to measure the capacity retention rate and the resistance increase rate.

Figure 1:
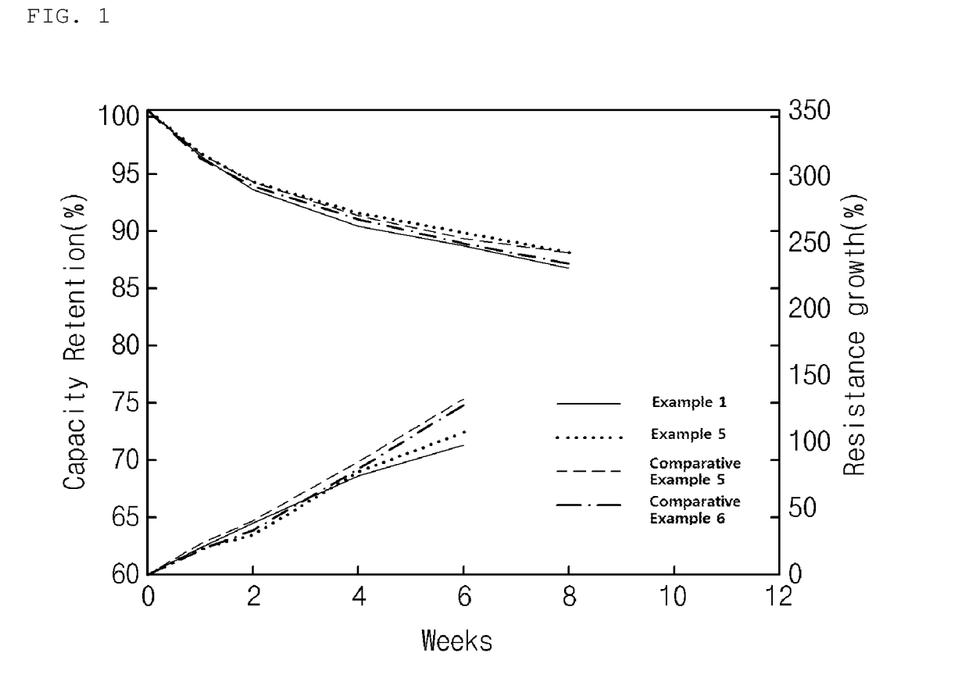
FIG. 1 is a graph showing the high-temperature storage properties of a coin cell manufactured in Examples 1 and 5, and Comparative Examples 5 and 6.

The measurement results are shown in FIG. 1. As shown in FIG. 1, up to 4 weeks of storage, the resistance increase rate of Examples 1 and 5 and the resistance increase rate of Comparative Examples 5 and 6 were not so different from each other. However, when stored for 6 weeks or longer, the resistance increase rate of Examples 1 and 5 were significantly lower than that of the Comparative Examples 5 and 6.

Experimental Example 3

High-Temperature Lifespan Properties (1)

The lifespan properties at a high temperature of the coin cells prepared in Examples 1-4 and Comparative Examples 1-4 were measured.

Specifically, each of the coin cells prepared in Examples 1-4 and Comparative Examples 1-4 was charged to 4.2 V with a constant current of 0.33 C at 45° C. with a cut-off of 0.05 C. Thereafter, the coin cells were discharged to 2.5 v with a constant current of 0.33 C.

The charge/discharge behavior was set as one cycle, and the cycle was repeated 200 times. Thereafter, the discharge capacity and resistance after 200 cycles were compared with the initial discharge capacity and the initial resistance to measure the capacity retention rate and the resistance increase rate. The measurement results are shown in Table 2 below.

TABLE 2

|  | Capacity retention rate (%) | Resistance increase rate (%) |
|---|---|---|
| Example 1 | 86 | 176 |
| Example 2 | 82 | 194 |
| Example 3 | 79 | 201 |
| Example 4 | 80 | 198 |
| Comparative Example 1 | 85 | 210 |
| Comparative Example 2 | 84 | 222 |
| Comparative Example 3 | 77 | 225 |
| Comparative Example 4 | 71 | 232 |

As shown in Table 2, the coin cells of Examples 1-4 have a capacity retention rate after 200 cycles of charge/discharge equal to or higher than that of the coin cells of Comparative Examples 1-4, and have a resistance increase rate lower than that of the coin cells of Comparative Examples 1-4.

Experimental Example 4

High-Temperature Lifespan Properties (2)

The lifespan properties at a high temperature of the coin cells prepared in Examples 1 and 5 and Comparative Examples 5 and 6 were measured.

Specifically, each of the coin cells prepared in Examples 1 and 5 and Comparative Examples 5 and 6 was charged to 4.2 V with a constant current of 0.1 C at 45° C. with a cut-off of 0.05 C. Thereafter, the coin cells were discharged to 3.0 v with a constant current of 0.1 C.

The charge/discharge behavior was set as one cycle, and the cycle was repeated 300 times. Thereafter, the discharge capacity after 300 cycles was compared with the initial discharge capacity to measure the capacity retention rate. The measurement results are shown in FIG. 2.

Figure 2:
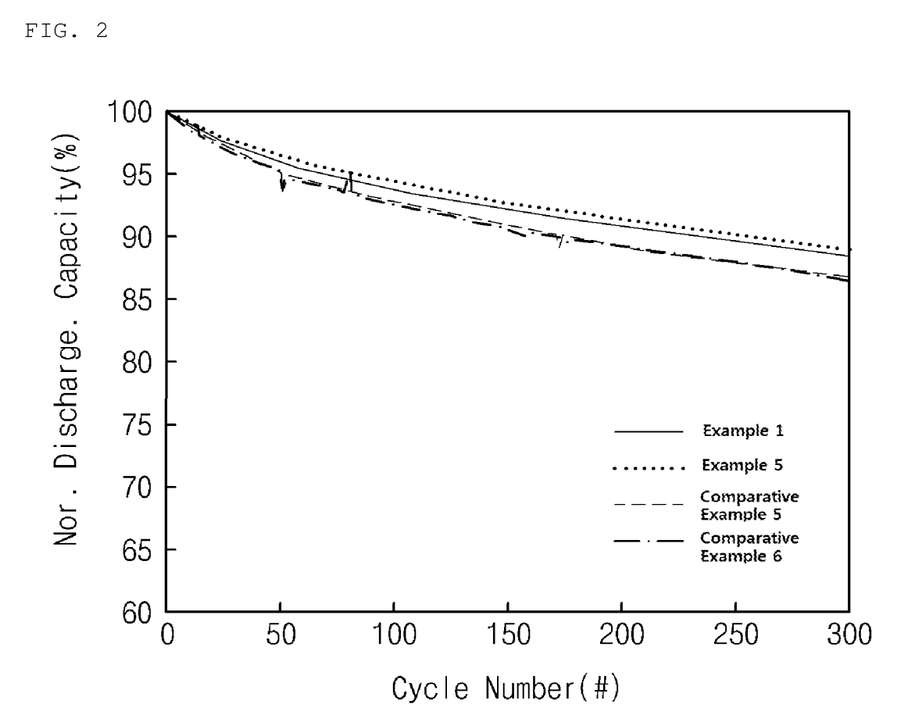
FIG. 2 is a graph showing the high-temperature lifespan properties of a coin cell manufactured in Examples 1 and 5, and Comparative Examples 5 and 6.

As illustrated in FIG. 2, the coin cells of Examples 1 and 5 have a relatively high capacity retention rate than the coin cells of Comparative Examples 5 and 6.

The invention claimed is:
1. A lithium secondary battery comprising:
a positive electrode including
    a lithium manganese-based first positive electrode active material having a spinel structure, and
    a lithium nickel-manganese-cobalt-based second positive active material;
a negative electrode including artificial graphite having a specific surface area (BET) of 0.1 m²/g to 1.2 m²/g and at least one selected from the group consisting of soft carbon and natural graphite, wherein the at least one selected from the group consisting of soft carbon and the natural graphite have a greater specific surface area than the artificial graphite;
a separator interposed between the positive electrode and the negative electrode; and
an electrolyte, wherein
the first positive electrode active material includes a lithium manganese oxide represented by Formula 1 below, and a coating layer positioned on the surface of the lithium manganese oxide and including one or more elements selected from the group consisting of Al, Ti, Zn, W, and B,
wherein the second positive electrode active material is a lithium nickel-manganese-cobalt oxide having a nickel molar ratio of 0.5 or more and less than 1.0:

$$Li_{1+a}Mn_{2-b}M^1{}_bO_{4-c}A_c \quad \text{[Formula 1]}$$

wherein, in Formula 1, $M^1$ is one or more doping elements selected from the group consisting of Al, Li, Mg, and Zn and A is one or more elements selected from the group consisting of F, Cl, Br, I, At, and S, and $0 \le a \le 0.2$, $0 < b \le 0.5$, and $0 \le c \le 0.1$.

2. The lithium secondary battery of claim 1, wherein the lithium nickel-manganese-cobalt oxide is represented by Formula 2 below:

$$Li_{1+x}[Ni_yCo_zMn_wM^2{}_v]O_{2-p}X_p \quad \text{[Formula 2]}$$

wherein, in Formula 2, $M^2$ is one or more selected from the group consisting of W, Cu, Fe, V, Cr, Ti, Zr, Zn, Al, In, Ta, Y, In, La, Sr, Ga, Sc, Gd, Sm, Ca, Ce, Nb, Mg, B, and Mo; X is one or more elements selected from the group consisting of F, Cl, Br, I, At, and S; and $0 \le x \le 0.3$, $0.50 \le y < 1$, $0 < z < 0.35$, $0 < w < 0.35$, $0 \le v \le 0.1$, and $0 \le p \le 0.1$.

3. The lithium secondary battery of claim 1, wherein the first positive electrode active material and the second positive electrode active material are included at a weight ratio of 10:90 to 90:10.

4. The lithium secondary battery of claim 1, wherein the positive electrode comprises a positive electrode active material having a bimodal particle diameter distribution including large diameter particles and small diameter particles having different average particle diameters ($D_{50}$).

5. The lithium secondary battery of claim 4, wherein the first positive electrode active material is the small diameter particles and the second positive electrode active material is the large diameter particles.

6. The lithium secondary battery of claim 1, wherein the positive electrode comprises a positive electrode current collector, a first positive electrode active material layer formed on the positive electrode current collector and a second positive electrode active material layer formed on the first positive electrode active material layer.

7. The lithium secondary battery of claim 6, wherein the first positive electrode active material and the second positive electrode active material are included in different layers.

8. The lithium secondary battery of claim 6, wherein the first positive electrode active material layer and the second positive electrode active material layer have different compositions.

9. The lithium secondary battery of claim 6, wherein
the first positive electrode active material layer comprises the first positive electrode active material in an amount of 50 wt % to 100 wt % based on the total positive electrode active materials included in a first positive electrode active material layer, and
the second positive electrode active material layer comprises the second positive electrode active material in an amount of 50 wt % to 100 wt % of the total positive electrode active materials included in a second positive electrode active material layer.

10. The lithium secondary battery of claim 6, wherein
the first positive electrode active material layer and the second positive electrode active material layer comprise a binder, and
the first positive electrode active material layer includes a binder in an amount of 1 wt % to 4 wt %, and
the second positive electrode active material layer includes a binder in an amount of 3 wt % or less.

11. The lithium secondary battery of claim 1, wherein the negative electrode comprises artificial graphite and soft carbon at a weight ratio of 50:50 to 95:5.

12. The lithium secondary battery of claim 1, wherein the soft carbon has a specific surface area (BET) of 7 $m^2/g$ to 10 $m^2/g$.

13. The lithium secondary battery of claim 1, wherein the negative electrode comprises a negative electrode current collector, a first negative electrode active material layer formed on the negative electrode current collector and a second negative electrode active material layer formed on the first negative electrode active material layer.

* * * * *